United States Patent [19]

Young, Jr.

[11] Patent Number: 5,251,277
[45] Date of Patent: Oct. 5, 1993

[54] OPTICAL FIBER COUPLER EXHIBITING REDUCED POLARIZATION SENSITIVITY AND METHOD OF MAKING SAME

[75] Inventor: Donald R. Young, Jr., Corning, N.Y.

[73] Assignee: Corning Incorporated, Corning, N.Y.

[21] Appl. No.: 944,044

[22] Filed: Sep. 11, 1992

[51] Int. Cl.$^5$ .............. G02B 6/26; G02B 23/20
[52] U.S. Cl. .................. 385/43; 385/42; 385/11; 385/51; 385/123; 385/141; 65/4.1; 65/4.2; 65/12
[58] Field of Search .......... 385/42, 43, 11, 46, 385/47, 50, 51, 123, 126, 127, 128, 141, 142, 144; 65/2, 3.1, 3.11, 4.1, 4.2, 12

[56] References Cited

U.S. PATENT DOCUMENTS

| | | | |
|---|---|---|---|
| 4,773,924 | 9/1988 | Berkey | 385/43 X |
| 4,799,949 | 1/1989 | Keck et al. | 65/3.12 |
| 4,801,185 | 1/1989 | Bricheno | 385/43 X |
| 4,822,126 | 4/1989 | Sweeny et al. | 385/43 X |
| 4,915,467 | 4/1990 | Berkey | 385/43 X |
| 4,931,076 | 6/1990 | Berkey | 65/4.2 |
| 5,011,251 | 4/1991 | Miller et al. | 385/43 X |
| 5,095,516 | 3/1992 | Sasaki et al. | 385/43 X |
| 5,131,735 | 7/1992 | Berkey et al. | 385/43 |
| 5,170,450 | 12/1992 | Dahlgren | 385/43 |
| 5,179,603 | 1/1993 | Hall et al. | 385/24 |
| 5,208,883 | 5/1993 | Hattori et al. | 385/43 |

*Primary Examiner*—Brian Healy
*Attorney, Agent, or Firm*—W. J. Simmons, Jr.

[57] ABSTRACT

An overclad fiber optic coupler of the type wherein a plurality of optical optical fibers, each having a core and a cladding, are fused together along a portion of the lengths thereof to form a coupling region. Surrounding the coupling region is a matrix glass body of refractive index n3 which is lower than the fiber cladding refractive index n2. The body has an inner region adjacent the optical fibers, an outer region having a radius greater than that of the inner region, and a transition region between the inner and outer regions. The softening point temperature of the inner region is greater than that of the outer region. The coupler exhibits both low polarization dependent loss and low excess loss.

14 Claims, 3 Drawing Sheets

OPTICAL FIBER COUPLER EXHIBITING REDUCED POLARIZATION SENSITIVITY AND METHOD OF MAKING SAME

BACKGROUND OF THE INVENTION

The present invention relates to overclad fiber optic couplers that exhibit low polarization dependent insertion loss.

Overclad fiber optic couplers comprise an elongated matrix glass body through which optical waveguide fibers longitudinally extend. The diameter of the central region of the coupler is smaller than that at the ends of the coupler, whereby the fibers are more closely spaced and are of smaller diameter in the central region than they are at the ends of the unit.

Overclad couplers are usually formed by inserting into a glass tube at least a portion of each of a plurality of optical fibers so that the fiber portions occupy the midregion of the tube. The tube is evacuated, and its midregion is heated and collapsed onto fibers. The central portion of the midregion is thereafter drawn down to that diameter and coupling length which is necessary to obtain the desired coupling between the fibers. Couplers having various kinds of coupling characteristics, e.g. wavelength division multiplexer (WDM), achromatic, and the like, have been made by this process. See, for example, U.S. Pat. Nos. 4,931,076 and 5,011,251.

The term "overclad coupler" also includes couplers of the type made in accordance with the teachings of U.S. Pat. No. 4,799,949. A coupler preform is initially formed; it comprises a plurality of spaced glass optical waveguide preforms disposed in a body of matrix glass of refractive index $n_3$. Each waveguide preform comprises a core and a cladding of refractive indices $n_1$ and $n_2$, respectively, where $n_1 > n_2 > n_3$. The preform is stretched to form a uniform diameter glass rod in which optical waveguide "fibers" are embedded in the matrix throughout their lengths. The rod is severed into a plurality of units. The central region of each unit is heated and stretched to elongate it and taper it inwardly. Although completely embedded in matrix glass throughout their lengths, the waveguide paths are referred to as fibers since they possess optical fiber dimensions at the ends of the coupler.

Commercially available single-mode optical fibers usually have a value of $n_2$ that is equal to or near that of silica. If silica is employed as the base glass for the tube, a dopant is added thereto for the purpose of decreasing $n_3$ to a value lower than $n_2$. The dopant $B_2O_3$ (and optionally fluorine) has been employed to lower the refractive index of silica tubes. They also advantageously decrease the tube viscosity during the tube collapse step to a value lower than that of the coupler fibers, boron having the greater effect on viscosity. This enhances to a certain extent the collapsing of the tube onto the fibers. These dopants also affect the temperature coefficient of expansion (TCE) of the tube, boron increasing the TCE relative to silica, while fluorine reduces the TCE relative to silica when used in concentrations needed for couplers.

When the amount of $B_2O_3$ (and optionally fluorine) in a silica tube is insufficient to soften the tube glass in $1 \times 2$ and $2 \times 2$ couplers, the tube glass excessively deforms the fibers during the tube collapse step, thus increasing the excess loss of the coupler. Silica coupler tubes have therefore contained a sufficient concentration of one or more of these dopants to provide an acceptably low value of excess loss. It was found, however, that overclad fiber optic couplers made from tubes containing such relatively high dopant concentrations exhibit an undesirably high polarization dependent insertion loss (PDL). In a $1 \times 2$ 3 dB coupler made from a tube of $SiO_2$ doped with 8 wt. % $B_2O_3$, for example, (the dopant concentration being substantially uniform with respect to radius) excess loss is 0.28 dB and PDL is 0.39 dB. The term "substantially uniform" is used herein to mean that the radial concentration of a dopant does not vary from an average value by more than 0.5 wt. percent.

PDL is characterized as follows. Polarized light from a laser is introduced into the coupler input fiber. The insertion loss is measured at one or more of the output fibers as the input source is rotated with respect to the input fiber to cause the polarization of the input power to rotate through 180°. The PDL is the difference between the maximum and the minimum measured insertion loss during this 180° rotation of the input polarization. The PDL results from stress caused by a mismatch between the physical properties, i.e. softening point temperature and TCE, of the fibers and the tube. Cooling rate of a glass body also affects stress.

To more closely match the physical characteristics of the tube to those of the fiber cladding, and thus lower the PDL, the $B_2O_3$ content throughout the tube can be decreased. In a $1 \times 2$ 3 dB coupler made from a tube of $SiO_2$ doped with about 3.5 wt. % $B_2O_3$, for example, (the dopant concentration being substantially uniform with respect to radius), the PDL is decreased to 0.19 dB, but excess loss will have increased to 1.14 dB. As $B_2O_3$ concentration in the tube is increased (while remaining substantially uniform with respect to radius), excess loss decreases, but PDL increases.

SUMMARY OF THE INVENTION

It is therefore an object of the present invention to provide overclad fiber optic couplers having both low PDL and low insertion loss.

Briefly, the present invention relates to overclad fiber optic couplers of the type that include an elongated matrix glass body having first and second opposed ends and a midregion. Extending longitudinally through the body are a plurality of optical fibers, each of which has a core surrounded by a cladding of refractive index greater than that of the body. The fibers are completely surrounded by the midregion of the body. The diameter of the central portion of the midregion and the diameters of the optical fibers in the central portion of the midregion are smaller than the diameters thereof at the ends of the body.

In accordance with the present invention, the body has an inner region adjacent the optical fibers, an outer region having a radius greater than that of the inner region, and a transition region between said inner and outer regions, the softening point temperature of the inner region being greater than that of the outer region. The softening point temperature of the inner region is sufficiently high that stress in the midregion adjacent the fibers is sufficiently low that said coupler exhibits a relatively low value of polarization dependent excess loss. The softening point temperature of the outer region is sufficiently low that the coupler exhibits a relatively low excess loss. In a preferred technique for obtaining the radially concentric regions, each region is provided with a substantially uniform radial composition profile of $B_2O_3$. The matrix glass body can also include fluorine to provide characteristics that are useful in certain types of couplers.

The coupler is preferably formed by inserting optical fibers into a glass tube, collapsing the tube midregion onto the fibers and drawing the central portion of the midregion. The tube has an inner region adjacent its bore and an outer region of radius greater than that of the inner region. The softening point temperature of the inner region is greater than that of the outer region.

DESCRIPTION OF THE PREFERRED EMBODIMENTS

The drawings are not intended to indicate scale or relative proportions of the elements shown therein.

Fiber optic couplers can be characterized by the number of optical fibers that extend from each end thereof, by the fraction of input power that is coupled to a particular output fiber, and by the wavelength sensitivity of the coupling. In an M×N coupler, where $M \leq 1$ and $N \leq 2$, M optical fibers extend from one end and N fibers extend from the other end. A 3 dB coupler, for example, is a 1×2 or 2×2 coupler that couples 50% of the power from a first fiber to a second fiber. A tap is a coupler (usually a 1×2 or 2×2 coupler) that couples less than 50% of the input power, usually a small percentage such as 3%, 10% or the like, to one output fiber. A switch is a coupler (usually a 1×2 or 2×2 coupler) that is packaged such that the percentage of power coupled from a first optical fiber to a second fiber can be changed by changing the angle at which the two fibers are bent in the plane of the two fibers (see U.S. Pat. No. 4,763,977). A WDM couples essentially all of the power at a first wavelength from the input fiber to a second fiber while essentially all of the power at a second wavelength remains in the input fiber. The present invention has relevance to all of the above-mentioned coupler types.

Typical of the couplers to which the invention pertains is the 2×2 coupler shown in FIGS. 1-5. Funnnels 14 and 15 of tube 10 connect longitudinal bore 11 to end surfaces 12 and 13, respectively. While bore 11 is shown as being circularly shaped, it could be non-circular as described in U.S. Pat. No. 5,009,692.

Figure 6:
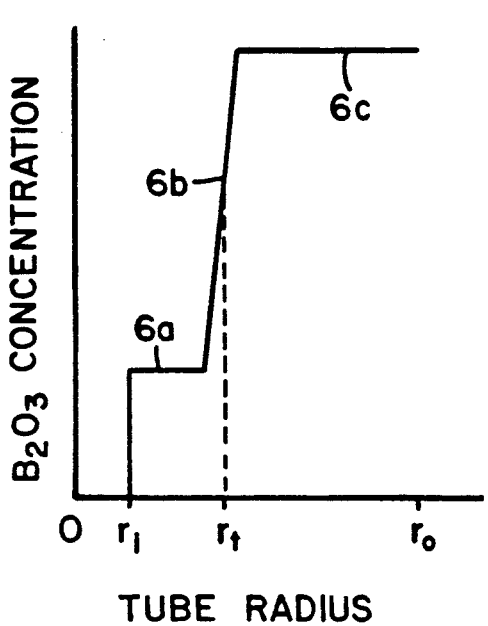
FIG. 6 is a graph of refractive index plotted as a function of tube radius for one type of tube.

In accordance with the present invention, relatively low values of both PDL and excess loss are obtained by employing a coupler tube that is composed of two radially concentric regions, the compositions of which are such that the inner region has a higher softening point temperature than the outer region. In a preferred technique for obtaining the radially concentric regions, each region has a substantially uniform radial composition profile of $B_2O_3$. In order to provide the required regions of different softening point temperature, the concentration of $B_2O_3$ in the inner region is lower than that in the outer region as shown in FIG. 6. The graph of FIG. 6 represents an average tube composition gradient including an inner region (line 6a) between radii $r_i$ and $r_t$, a transition region (line 6b), the center of which is located at $r_t$, and an outer region (line 6c) between radii $r_t$ and $r_o$. Radii $r_i$ and $r_o$ represent the inner and outer surfaces of the tube. The concentration of $B_2O_3$ in the inner region (line 6a) is between 1.5 wt. % and 3.5 wt. %, and the concentration of $B_2O_3$ in the outer region (line 6c) is between 6.5 wt. % and 11.0 wt. %. The composition of the inner region has a sufficiently high softening point temperature to provide a relatively low PDL. The outer tube region is formed of a composition the softening point temperature of which is sufficiently low to provide a relatively low insertion loss.

One of the coupler tubes described herein (for a WDM coupler) also contains fluorine for the purpose of adjusting the spacing between the coupled and non-coupled wavelengths. When fluorine is employed, its concentration in the inner region is between 1.8 wt. % and 2.8 wt. %, and its concentration in the outer region is between 1.0 wt. % and 2.0 wt. %.

Tube refractive index was measured on a York Preform Analyzer as a refractive index change relative to silica at 850 nm. The $B_2O_3$ concentration of a tube comprising $SiO_2$, doped with only $B_2O_3$ was determined from the known relationship between $B_2O_3$ content and refractive index. The average location of the refractive index change on the York plot was taken as the location of the transition region $r_t$. This point is specified herein as a percentage of the distance from the tube inner surface $r_i$ to the tube outer surface $r_o$, i.e. the hole is excluded. The transition region $r_t$ is between 20% and 41% of the distance from $r_i$ to $r_o$. After collapse of the tube onto the fibers, the transition region is located between about 25% and 50% of the radius of the outer surface of the device.

Some tube compositions were measured on a microprobe using a 40 μm spot at 10 locations across the radius to determine the wt. % of fluorine, silicon oxide ($SiO_2$), and boron oxide ($B_2O_3$). Three measurements were made per blank.

Coated optical fibers 16 and 17 are sufficiently long that connection can easily be made to the fiber "pigtails" extending from the coupler. Coated fibers 16 and 17 are composed of optical fibers 20 and 21 (each having core and cladding regions) and their protective coatings 18 and 19, respectively. Portions of coatings 18 and 19 are stripped from coated fibers 16 and 17 at locations remote from the fiber ends. Fiber 16 is threaded through bore 11 until its uncoated portion is centered in tube 10. Fiber 17 is then threaded through bore 11 until its uncoated portion is centered in tube 10. The fiber threading step can be performed either "off-line" (prior to mounting the tube in the stretch apparatus) or "on-line" (after the tube has been mounted in the stretch apparatus). In accordance with either technique, the operator can observe the position of the uncoated fibers and the adjacent coatings through the glass tube in order to properly position the fibers. A fiber insertion stations is disclosed in U.S. Pat. No. 5,009,692.

Figure 3:
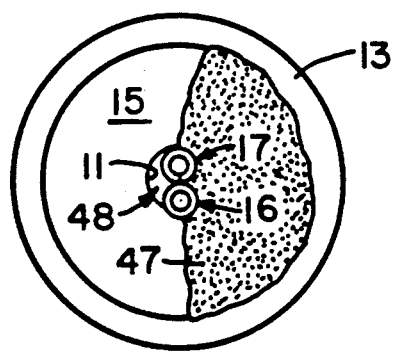
FIG. 3 is an end view of the preform of FIG. 3.
Figure 2:
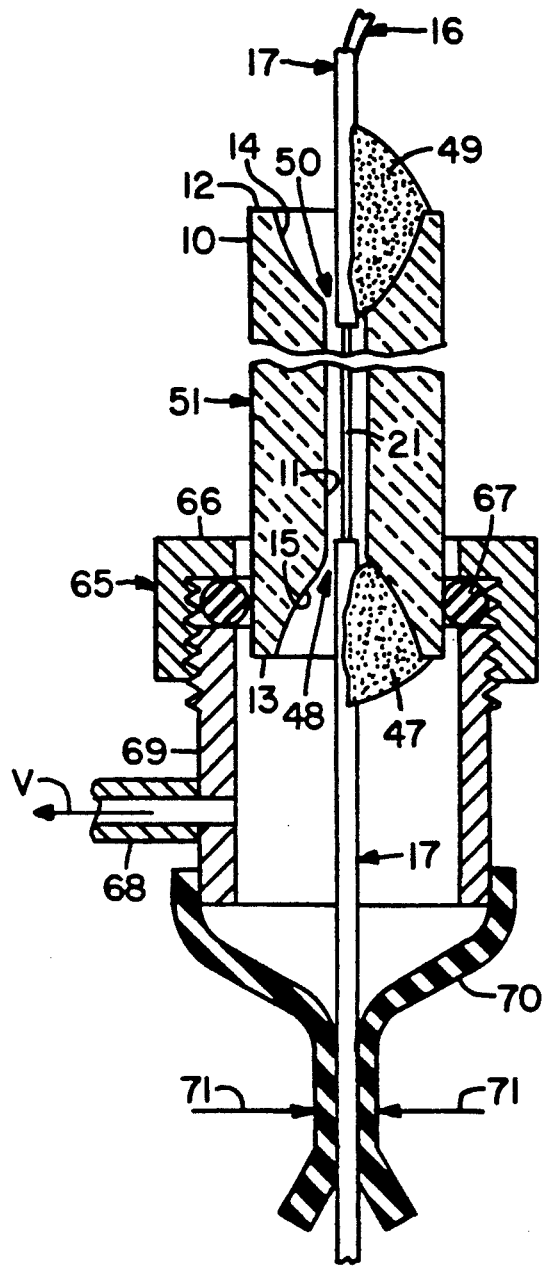
FIG. 2 is a cross-sectional view of a coupler preform connected to apparatus for evacuating the tube.

As shown in FIGS. 2 and 3, small amount 47 of glue is applied to one side of fibers 16 and 17 to attach them to one side of funnel 15 while leaving an opening 48 which permits access to bore 11 between glue 47 and the remainder of the funnel 15. A drop 49 of glue is similarly applied between fibers 16 and 17 and funnel 14, leaving bore access opening 50 between glue 49 and funnel 14. A slight tension is preferably applied to the fibers while they are being glued to the funnels.

Tube midregion 22 is then collapsed onto optical fibers 21 and 22 and thereafter stretched to form the coupling region. These steps can be performed in the draw apparatus of FIG. 4. Preform 51 is inserted through ring burner 60 and is clamped to draw chucks 61 and 62 which were mounted on motor controlled stages 63 and 64. The fibers are threaded through the vacuum attachments 65 and 65', which are then sealed to the ends of preform 51. Referring to FIG. 2, vacuum attachment 65 is slid over the end of tube 10, and collar 66 is tightened to compress O-ring 67 against tube 10. One end of a length of thin rubber tubing 70 is attached to that end of vacuum attachment 65 opposite preform 51; the remaining end of the tubing extending within tube clamping means (not shown). Upper vacuum attachment 65' is similarly associated with line 68', tubing 70' and tube clamping means. The coated portions of the fibers extend from tubing 70 and 70'. When air pressure is directed against tubing 70 and 70' as indicated by arrows 71, 71', to clamp the tubing against the fibers extending therethrough, bore 11 is evacuated through line 68.

When tube midregion 22 is heated by ring burner 60, it collapses onto optical fibers 20 and 21. Thereafter, burner 60 is reignited to heat the center of the collapsed region, and stages 63 and 64 move to form neckdown region 81 of fiber optic coupler 80 (FIG. 6). Additional glue 82, 83 is applied to funnels 14 and 15 and the uncollapsed bore portions 11a and 11b. This can be done in accordance with the teachings of U.S. patent application Ser. No. 07/913,622 (G. E. Berkey et al. 26-7) filed Jul. 16, 1992.

Coupler tubes for following examples were produced as follows. A porous preform having the desired radial composition of $B_2O_3$-doped $SiO_2$ particles was formed on an alumina mandrel by a process similar to those disclosed in U.S. Pat. No. 4,165,223 and U.S. patent application Ser. No. 07/809,697 filed Dec. 16, 1991. The outside diameter of the mandrel tapered from 9.5 mm to 12.6 mm over its 107 cm length. The mandrel was rotated and translated with respect to the burner, which was positioned 17.2 cm from the mandrel. Auxiliary burners directed flames toward the ends of the porous glass preform during deposition. The burner traversed a 70 cm section of the mandrel in 30 seconds. Carbon particles were initially deposited on the mandrel to facilitate removal of the porous preform. Thereafter, the reactants, $SiCl_4$ and $BCl_3$ were supplied to a flame hydrolysis burner in accordance with the following programs, and the burner directed a stream of $B_2O_3$-doped $SiO_2$ particles toward the mandrel.

EXAMPLE A - MAKING TUBES FOR EXAMPLES 1 AND 2

$SiCl_4$ and $BCl_3$ flowed to the burner at 2.25 slpm and 230 sccm, respectively, as it traversed the preform 100 times to form the inner region. To form the transition region, the flow rate of $BCl_3$ was linearly ramped to 490 sccm and the flow rate of $SiCl_4$ was linearly ramped to 0.95 slpm from burner pass 101 to pass 110. The flow rates of the reactants remained constant at those values from pass 110 to pass 350 to form the outer region.

The resultant porous preform was loaded into a scanning consolidation furnace of the type disclosed in U.S. Pat. No. 4,741,748 where it was dried, consolidated and etched. During these steps, a muffle gas consisting of 20 slpm helium flowed upwardly from the bottom of the muffle.

During the drying step, a movable induction coil was reciprocated back and forth along the length of the preform at a rate of 1800 mm/minute to isothermally increase its temperature from room temperature to about 1030° C. A drying gas mixture consisting of 1 slpm oxygen, 70 sccm chlorine and 0.7 slpm helium flowed into the axial aperture from which the mandrel had been removed. While the temperature remained at 1030° C., this gas mixture continued to flow for 40 minutes to dry the preform.

While the drying gas mixture continued to flow, the porous preform was consolidated to form a dense glass tube by traversing the coil upwardly along the preform at 12 mm/minute for 83.3 minutes to generate in the preform a sharp 1400° C. hot zone.

The inner surface of the resultant tubular blank was then etched by flowing a gas mixture of 0.1 slpm oxygen, 0.3 slpm helium and 75 sccm $SF_6$ into the top of the axial aperture for the next 71.4 minutes. The coil traversed the preform at 14 mm/minute to generate in the preform a sharp 1365° C. hot zone.

EXAMPLE B - MAKING THE TUBE FOR EXAMPLE 3

To form the inner region of the tube, 2.25 slpm $SiCl_4$ and 176 sccm $BCl_3$ flowed to the burner as it traversed the preform 101 times. To form the transition region, the flow rate of $BCl_3$ was linearly ramped to 480 sccm and the flow rate of $SiCl_4$ was linearly ramped to 1.0 slpm from pass 101 to pass 110. The flow rates of the reactants remained constant at those values from pass 111 to pass 380 to form the outer region.

The steps of drying, consolidating and etching were similar to those described in connection with Example A except that the consolidation temperature was 1413° C. and the etch temperature was 1384° C.

EXAMPLE C - MAKING THE TUBE FOR EXAMPLE 4

To form the inner region of the tube, 2.25 slpm $SiCl_4$ and 220 sccm $BCl_3$ flowed to the burner as it traversed the preform 86 times. To form the transition region, the flow rate of $BCl_3$ was linearly ramped to 490 sccm and the flow rate of $SiCl_4$ was linearly ramped to 0.95 slpm from burner pass 86 to pass 95. The flow rates of the reactants remained constant at these values from pass 96 to pass 380 to form the outer region.

The resultant porous preform was then loaded into a scanning consolidation furnace where it was dried, doped, consolidated and etched. The drying step was similar to the drying step of Example A except that its duration was 20 minutes.

The porous preform was doped with fluorine during the next 20 minutes by flowing 200 sccm $SiF_4$ and 100 sccm $BF_3$ along with the drying gas mixture into the preform aperture. The temperature remained at 1030° C. The gas mixture remained the same for the consolidation step except that the $SiF_4$ flow was increased to 1.9 slpm; the consolidation temperature was 1364° C. The fluorine content of the resultant tube decreased radially, the average fluorine content in the inner region being about 2.3 wt. %, and the average fluorine content in the outer region being about 1.5 wt. %.

The etching step was similar to that of Example A.

The consolidated and etched blanks resulting from the methods of Examples A, B and C were drawn to form an elongated tube, the bore diameter of which was the size required for making couplers. The elongated tube was severed into coupler tubes.

The coupler tubes for comparative Examples 1A, 2A, 3A and 4A were made by a method similar to that used to make the tube of Example C except that the flow rates of $SiCl_4$ and $BCl_3$ during the deposition of particles on the mandrel were such that the $B_2O_3$ content of the resultant tube was substantially uniform.

EXAMPLE 1

A 2×2 3 dB fiber optic coupler was made as follows. A glass capillary tube 10 having a 3.2 cm length, 2.65 mm outside diameter, and 380 μm bore diameter was employed. The length of bore 11 was approximately 27 mm. The inner region of tube 10 was composed of $SiO_2$ doped with about 3.0 wt. % $B_2O_3$. The outer region was composed of $SiO_2$ doped with about 10 wt. % $B_2O_3$. The transition region $r_t$ occured at 35% of the distance between $r_i$ and $r_o$. The width of the transition region was 2.6% of the thickness of the tube.

To form funnels 14 and 15, one end of tube 10 was heated while $NF_3$ was flowed into the other tube end; the gas etched the heated end of tube 10 as it exited.

Two 3 m lengths 16 and 17 of coated optical fiber were severed from a reel of fiber; they comprised 125 μm diameter single-mode optical fibers 20 and 21 having 250 μm diameter urethane acrylate coatings 18 and 19, respectively. Each of these fibers was a dispersion shifted fiber of the type taught in U.S. Pat. No. 4,715,679. A 29 mm long portion of coating 18 was stripped from coated fiber 16 which was then wiped with an ethyl alcohol containing cloth. A first end of fiber 16 was threaded through bore 11, the bore being lubricated by squirting ethyl alcohol into it, as necessary. After the ends of coating 18 were centered in funnels 14 and 15, the first end was secured by a clamp. The second end of fiber 16 was clamped to a 7 g weight. A 23 mm long portion of coating 19 was stripped from coated fiber 17, and the fiber was similarly cleaned and threaded through tube 10 until the ends of coating 19 were centered in bore 11. The first end of fiber 17 was then secured by a clamp, and the second end thereof was clamped to a 7 g weight. Excess alcohol was blown from the tube bore by dry nitrogen.

An operator centered the short stripped section of fiber in the bore by moving the tube. The ends of coating 19 then protruded a distance d of about 2 mm beyond the bottoms (narrow ends) of the funnels into each end of bore 11.

While the fibers extended parallel to one another, being tensioned by the weights, they were tacked to the funnels as described above using UV cure epoxy resin code No. 2728 manufactured by Electrolite Corporation of Danbury, Conn. A small amount 47 of the glue was carefully applied to one side of the tube to attach fibers 16 and 17 to funnel 15 and was cured by exposure to UV light. A small amount 49 of the glue was then similarly employed to attach fibers 16 and 17 to funnel 14.

Preform 51 was inserted through the ring burner, clamped to the draw chucks, and vacuum attachments were sealed to its ends. With a vacuum of 50.8 cm of mercury applied to bore 11, burner 60 was ignited. Gas and oxygen were supplied to the burner at rates of 0.33 slpm and 0.67 slpm, respectively. The flame heated tube 10 for about 25 seconds, and midregion 22 collapsed onto fibers 20 and 21.

Figure 5:
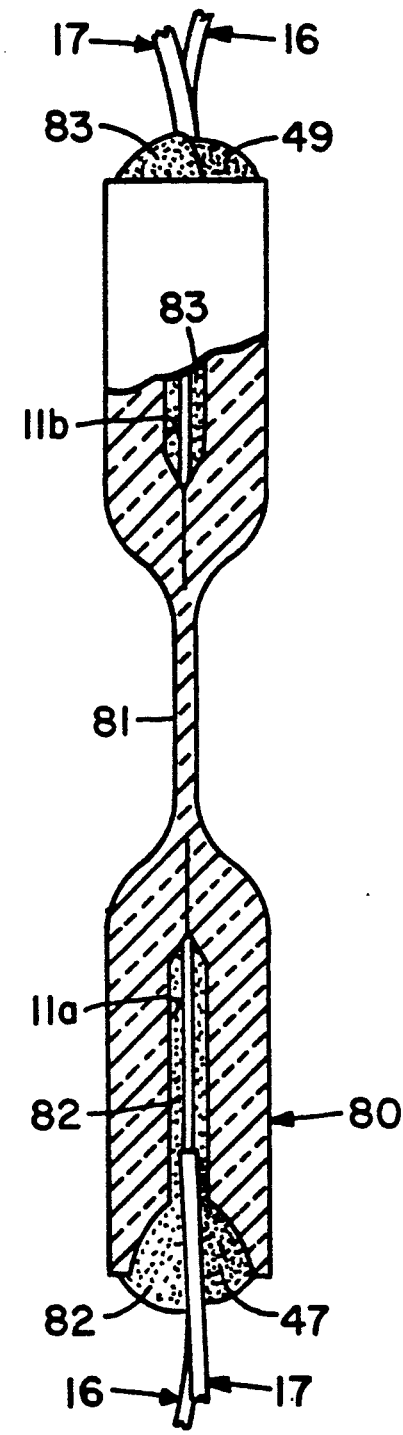
FIG. 5 is a partial cross-sectional view of a drawn coupler that has been sealed at its ends.

After the tube cooled, the burner was reignited, the flow rates of the gas and oxygen having been increased to 0.37 slpm and 0.74 slpm, respectively, to heat the center of the collapsed region. After about 12 seconds, the oxygen flow was gradually reduced over a period of about one second to allow the coupler to cool below the glass transition temperature. The gas and oxygen were then turned off. Stages 63 and 64 were moved in opposite directions at a combined rate of 0.60 cm/sec to elongate preform 51 by about 11.0 mm to form neckdown region 81 (FIG. 5). After the resultant fiber optic coupler had cooled, the vacuum lines were removed.

The coupler remained in the chucks during the application of additional glue to funnels 14 and 15 and the uncollapsed bore portions 11a and 11b. One end of an 80 μm outside diameter hollow silica microtube was connected to a source of vacuum. The remaining end was inserted through funnel 15 and opening 48 to the bottom of uncollapsed bore portion 11a (FIG. 5). When a drop of Electrolite 2500 epoxy resin made by Electrolite Corporation of Danbury, Conn., was placed in funnel 15, it flowed into bore portion 11a where it flowed a short distance into the microtube. This gluing procedure was repeated at uncollapsed bore portion 11b. The glue was cured by exposure to ultraviolet light, the coupler was removed from the chucks, and the protruding hollow filaments were severed.

This process produced more than one hundred 3 dB couplers that operated at 1480 nm. Average excess device loss was about 0.25 dB, and average PDL was 0.07 dB.

COMPARATIVE EXAMPLE 1A

A 2×2 3 dB coupler was made by a method similar to that described in Example 1 except that standard single-mode fiber was employed and the tube had a substantially uniform radial composition profile of $SiO_2$ doped with 2 wt. % $B_2O_3$, and the fluorine content thereof linearly decreased from 2 wt. % at the inner surface to 1 wt. % at the outer surface. The use of standard single-mode fibers did not affect the PDL of the resultant couplers. Such fibers comprise a 8 μm diameter core of $SiO_2$ doped with 8.5 wt. % $GeO_2$ and a 125 μm diameter $SiO_2$ cladding.

This process produced more than one hundred 3 dB couplers that were designed for operation at 1475 nm. Average excess device loss was about 0.48 dB, and average PDL was 0.19 dB.

EXAMPLE 2

A 2×2 10 dB tap was made by a method similar to that described in Example 1 except that the preform was elongated by 3.97 mm to form the neckdown region.

This process produced hundreds 2×2 10 dB couplers that coupled 10% of the input power at 1558 nm from leg 1 (see FIG. 7) to leg 3. The average insertion loss (legs 1-2) was about 0.65 dB, and the average insertion loss (legs 1-3) was about 10.5 dB. The average PDL (legs 1-3) was 0.14 dB.

COMPARATIVE EXAMPLE 2A

A 2×2 10 dB tap was made by a method similar to that described in Example 2 except that standard single-mode fiber was employed and the tube was as described in Example 1A.

Figure 7:
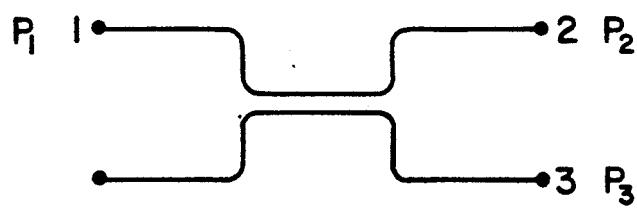
FIGS. 7 and 8 are schematic diagrams of 2×2 and 1×2 couplers, respectively.

This process produced hundreds of 2×2 10 dB couplers. The average insertion loss (legs 1-2) was about 0.70 dB, and the average insertion loss (legs 1-3) was about 10.5 dB. The coupler legs are shown in FIG. 7. The average PDL (legs 1-3) was 0.96 dB.

EXAMPLE 3

Figure 1:
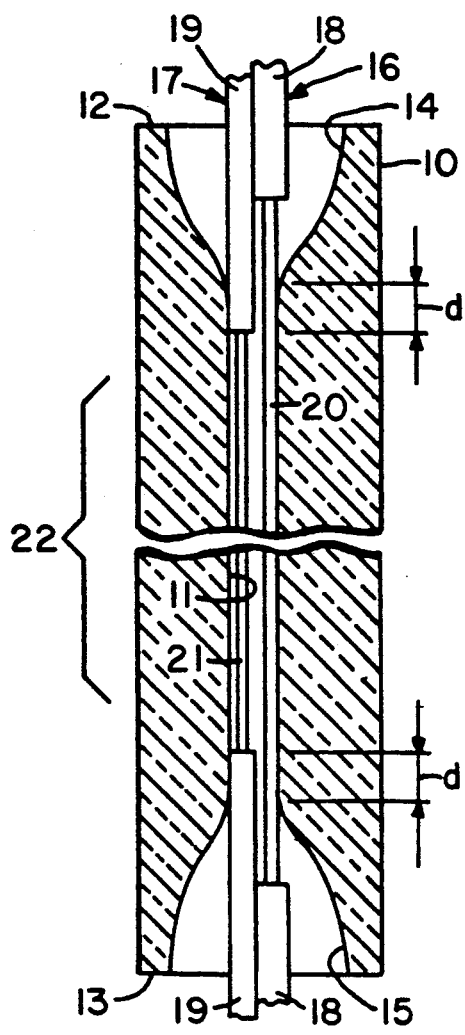
FIG. 1 is a cross-sectional view illustrating the position of fibers in the bore of a 2×2 coupler tube.
Figure 9:
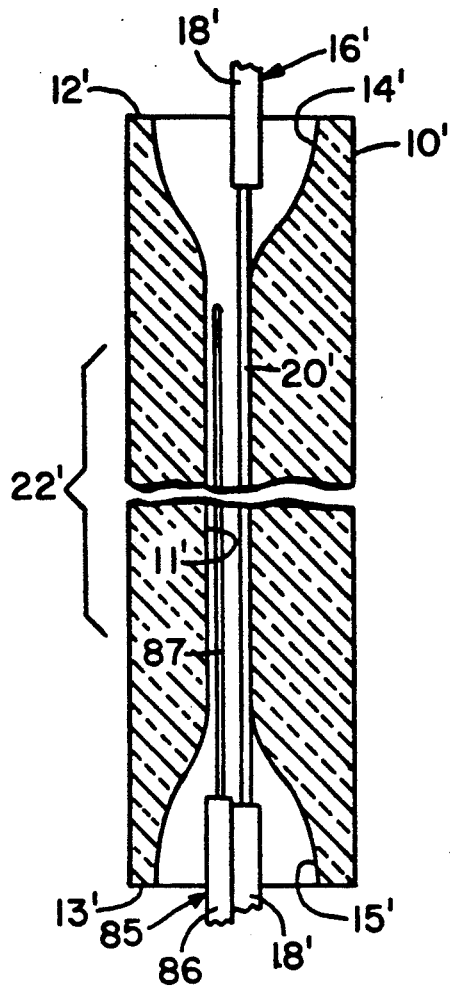
FIG. 9 is a cross-sectional view illustrating the position of fibers in the bore of a 1×2 coupler tube.

A 1×2 23.5 dB tap was made by a method similar to that described in Example 1 except for the following differences, reference being made to FIG. 9 wherein elements similar to those of FIG. 1 are represented by primed reference numerals. A tube 10' having a 3.2 cm length, 270 μm bore diameter, and 2.65 mm outside diameter was inserted into the apparatus of FIG. 9. The inner region of tube 101 was composed of $SiO_2$ doped with about 2.0 wt. % $B_2O_3$. The outer region was composed of $SiO_2$ doped with about 7.5 wt. % $B_2O_3$. The transition region $r_t$ occured at 36% of the distance between $r_i$ and $r_o$. The width of the transition region was 2.6% of the thickness of the tube.

Approximately 27 cm of coating was stripped from the central region of a 3 meter length of fiber 16'. A section of coating 86 about 40 mm long was removed from the end of a 1.5 meter length of coated fiber 85. An antireflection termination was formed on the end of fiber 87 by directing a flame at the center of the stripped region of fiber, while the end of the fiber was pulled and severed to form a tapered end. The tip of fiber 87 was heated by a burner flame to cause the glass to recede and form a rounded endface, the diameter of which was equal to or slightly smaller than the original uncoated fiber diameter. The resultant stripped end region was about 24 mm long.

Coated fiber 16' was inserted through bore 11' until its uncoated portion was situated below tube end 13'. The uncoated portion of coated fiber 85 was held adjacent the uncoated portion of coated fiber 16', and both were moved together toward tube end 12' until the coating end regions were interior to funnel 15'. The uncoated portion of coated fiber 16' was then disposed intermediate end surfaces 12' and 13'. The end of fiber 87 was located between midregion 22' and end 12' of tube 10'. The tube collapse and stretch steps were similar to those described in Example 1 except that the preform was elongated by about 6.6 mm to form the neckdown region.

This process produced hundreds of 1×2 23.5 dB taps that coupled 0.4% of the input power at 1558 nm from leg 1 (see FIG. 8) to leg 3. The average insertion loss (legs 1-2) was 0.25 dB, and the average insertion loss (legs 1-3) was 23.5 dB. The average PDL (legs 1-2) was 0.01 dB, and the average PDL (legs 1-3) was 0.21 dB.

COMPARATIVE EXAMPLE 3A

A 1×2 25 dB tap was made by a method similar to that described in Example 3 except that standard single-mode fiber was employed, and the tube was as described in Example 1A. Since this example pertains to 25 dB taps rather than 23.5 dB taps, the stretch distance was about 6.7 mm.

This process produced hundreds 1×2 25 dB taps that coupled 0.3% of the input power at 1558 nm from leg 1 (FIG. 8) to leg 3. The average insertion loss (legs 1-2) was about 0.21 dB, and the average insertion loss (legs 1-3) was about 24.9 dB. The average PDL (legs 1-2) was 0.01 dB, and the average PDL (legs 1-3) was 2.26 dB.

EXAMPLE 4

A 1480/1558 nm 1×2 WDM coupler was made by a method similar to that described in Example 3 except for the following differences.

The tube dimensions were the same as Example 3. The inner region of tube 10 was composed of $SiO_2$ doped with about 2.5 wt. % $B_2O_3$ and 2.3 wt % fluorine. The outer region was composed of $SiO_2$ doped with about 7.5 wt. % $B_2O_3$ and 2.3 wt % fluorine. The transition region $r_t$ occured at 36% of the distance between $r_i$ and $r_o$. The width of the transition region was 2.6% of the tube thickness.

Figure 4:
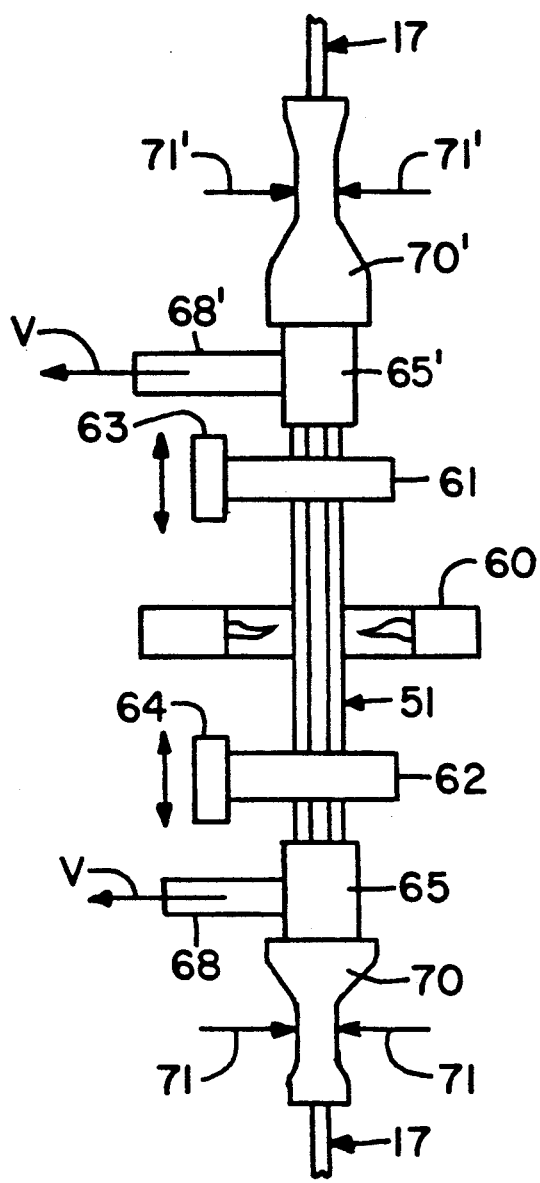
FIG. 4 is a schematic illustration of coupler forming apparatus.

The coupler preform, which was formed by a method similar to that described in Example 3, was inserted into the apparatus of FIG. 4. The tube collapse and stretch steps were similar to that described in Example 1 except that the combined stretch rate of both stages was 5.0 cm/sec, and the preform was elongated by 33 mm to form the neckdown region.

This process produced hundreds of 1480/1558 nm 1×2 WDM couplers that coupled 98% of the input power at 1558 nm from leg 1 (see FIG. 8) to leg 2 and 98% of the input power at 1480 nm to leg 3. The average insertion loss (legs 1-2) at 1558 nm was 0.4 dB, and the average insertion loss (legs 1-3) at 1480±10 nm was 0.4 dB. The average PDL (legs 1-2) at 1558 nm was 0.05 dB, and the average PDL (legs 1-3) at 1480 nm was 0.4 dB.

COMPARATIVE EXAMPLE 4A

A 1475/1558 nm 1×2 WDM coupler was made by a method similar to that described in Example 4 except that the tube was as described in Example 1A.

Figure 8:
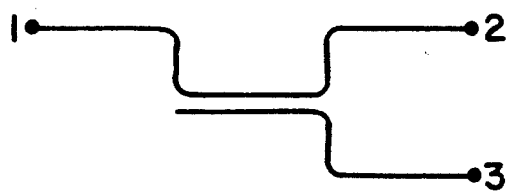

This process produced hundreds of 1×2 WDM couplers. The average insertion loss (legs 1-2) at 1558 nm was 0.31 dB, and the average insertion loss (legs 1-3) at 1475 nm was 0.52 dB. The coupler legs are shown in FIG. 8. The average PDL (legs 1-2) at 1558 nm was 0.11 dB, and the average PDL (legs 1-3) at 1475 nm was 0.08 dB.

What is claimed is:

1. A fiber optic coupler comprising
   an elongated body of matrix glass of refractive index $n_3$, said body having first and second opposed ends and a midregion,
   a plurality of optical fibers extending longitudinally through said body, each of said fibers comprising a core of refractive index n, surrounded by a cladding of refractive index $n_2$, where $n_1 > n_2 > n_3$,
   said fibers being fused to the midregion of said body, the diameter of the central portion of said midregion and the diameters of said optical fibers in said central portion of said midregion being smaller than the diameters thereof at the ends of said body,
   said body having an inner region adjacent said optical fibers, an outer region having a radius greater than that of said inner region, and a transition region between said inner and outer regions, the softening point temperature of said inner region being sufficiently high that stress in said midregion adjacent said fibers is sufficiently low that said coupler exhibits a relatively low value of polarization dependent excess loss, the softening point temperature of said outer region being sufficiently low that said coupler exhibits a relatively low excess loss.

2. A fiber optic coupler in accordance with claim 1 wherein the outer region of said tube constitutes the major portion of the volume of said tube.

3. A fiber optic coupler in accordance with claim 1 wherein the average radius of said transition region is between about 25 to 50% of the outer radius of said body.

4. A fiber optic coupler in accordance with claim 1 wherein the said inner region comprises $SiO_2$ doped with 1.5 wt. percent to 3.5 wt. percent $B_2O_3$, and said outer region comprises $SiO_2$ doped with 6.5 wt. percent to 11.0 wt. percent $B_2O_3$.

5. A fiber optic coupler comprising
an elongated body of matrix glass of refractive index $n_3$, said body having first and second opposed ends and a midregion,
a plurality of optical fibers extending longitudinally through said body, each of said fibers comprising a core of refractive index $n_1$ surrounded by a cladding of refractive index $n_2$, where $n_1 > n_2 > n_3$,
said fibers being fused to the midregion of said body, the diameter of the central portion of said midregion and the diameters of said optical fibers in said central portion of said midregion being smaller than the diameters thereof at the ends of said body,
said body having a substantially uniform composition inner region adjacent said optical fibers and a substantially uniform composition outer region having a radius greater than that of said inner region, the softening point temperature of said inner region being greater than that of said outer region, the softening point temperature of said inner region being sufficiently high that stress in said midregion adjacent said fibers is sufficiently low that said coupler exhibits a relatively low value of polarization dependent excess loss, the softening point temperature of said outer region being sufficiently low that said coupler exhibits a relatively low excess loss.

6. A fiber optic coupler in accordance with claim 5 wherein the outer region of said body constitutes the major portion of the volume of said body.

7. A fiber optic coupler in accordance with claim 5 further comprising a transition region between said inner and outer regions, the average radius of said transition region is between about 25 to 50% of the outer radius of said body.

8. A fiber optic coupler in accordance with claim 5 wherein the said inner region comprises $SiO_2$ doped with 1.5 wt. percent to 3.5 wt. percent $B_2O_3$, and said outer region comprises $SiO_2$ doped with 6.5 wt. percent to 11.0 wt. percent $B_2O_3$.

9. A fiber optic coupler in accordance with claim 5 wherein at least one optical fiber extends from said first end of said body and two optical fibers extend from said second end of said body.

10. A fiber optic coupler in accordance with claim 5 wherein M optical fibers extend from said first end of said body and N optical fibers extend from said second end of said body, wherein $M \geq 1$ and $N \geq 2$.

11. A method of making a fiber coupler comprising
providing a glass tube having first and second opposite end portions and a midregion, a longitudinal bore within said tube, said tube having an inner region adjacent said bore and an outer region of radius greater than that of said inner region, and a transition region between said inner and outer regions, the softening point temperature of said inner region being greater than that of said outer region,
disposing within said longitudinal bore at least a portion of each of a plurality of glass optical fibers, each of said fibers having a core surrounded by a cladding of refractive index less than that of said core, the refractive index of the claddings of said plurality of optical fibers being greater than the refractive index of said tube, at least that part of each fiber that is located in the tube midregion having no coating thereon, said fibers having a coextensive relationship in said tube midregion, at least a portion of at least one of the fibers in said midregion extending beyond the first end of said tube, at least a portion of at least another of the fibers in said midregion extending beyond the second end of said tube,
collapsing said tube midregion onto said fibers, and
drawing the central portion of said midregion to reduce the diameter thereof and form a coupling region in which light propagating in one of said fibers couples to another of said fibers, the softening point temperature of said inner region being sufficiently high that stress in said midregion adjacent said fibers is sufficiently low that said coupler exhibits a relatively low value of polarization dependent excess loss, the softening point temperature of said outer region being sufficiently low that said coupler exhibits a relatively low excess loss.

12. A method in accordance with claim 11 wherein the step of providing a glass tube comprises providing a tube having an inner region, an outer region and a transition region, said outer region of said tube constituting the major portion of the volume of said tube.

13. A method in accordance with claim 11 wherein the step of providing a glass tube comprises providing a tube having an inner region, an outer region and a transition region, the average radius of said transition region being between about 20 to 41% of the outer radius of said tube.

14. A method in accordance with claim 11 wherein the step of providing a glass tube comprises providing a tube having an inner region, an outer region and a transition region, said inner region comprising $SiO_2$ doped with 1.5 wt. percent to 3.5 wt. percent $B_2O_3$, and said outer region comprising $SiO_2$ doped with 6.5 wt. percent to 11.0 wt. percent $B_2O_3$.

* * * * *